United States Patent [19]

Popovitz-Biro et al.

[11] Patent Number: 5,174,498

[45] Date of Patent: Dec. 29, 1992

[54] CLOUD SEEDING

[75] Inventors: Ronit Popovitz-Biro, Rehovot; Michal Gavish, Ramat Gan; Leslie Leiserowitz; Meir Lahav, both of Rehovot, all of Israel

[73] Assignee: Yeda Research and Development Co. Ltd., Rehovot, Israel

[21] Appl. No.: 641,136

[22] Filed: Jan. 15, 1991

[30] Foreign Application Priority Data

Jan. 15, 1990 [IL] Israel ........................................ 93066
Nov. 29, 1990 [IL] Israel ........................................ 96512

[51] Int. Cl.⁵ ..................... A01G 15/00; B01D 17/00; E01H 13/00
[52] U.S. Cl. .................................... 239/2.1; 252/305; 252/319
[58] Field of Search ................. 252/305, 319; 239/2.1, 239/2.2, 8

[56] References Cited

U.S. PATENT DOCUMENTS

| | | | |
|---|---|---|---|
| 2,721,495 | 10/1955 | Schaefer | 252/305 X |
| 2,908,442 | 10/1959 | Stone | 252/319 X |
| 3,127,107 | 3/1964 | Merryweather | 252/319 X |
| 3,330,069 | 7/1967 | Mihara | 252/319 X |
| 3,654,175 | 4/1972 | Henderson | 252/305 |
| 3,835,059 | 9/1974 | Fukuta et al. | 252/305 |
| 3,887,580 | 6/1975 | Patrikeev et al. | 239/21 X |
| 5,005,355 | 4/1991 | Singh | 252/319 X |

FOREIGN PATENT DOCUMENTS 2323075  11/1974  Fed. Rep. of Germany ....... 239/2.1

Primary Examiner—Richard D. Lovering
Attorney, Agent, or Firm—Browdy and Neimark

[57] ABSTRACT

Long-chain aliphatic alcohols are provided that induce nucleation of ice at temperatures within the range from $-8°$ C. to $0°$ C., from supercooled water present as small drops and/or in the vapor state, and are useful for seeding supercooled clouds in order to augment rainfall.

8 Claims, No Drawings

CLOUD SEEDING

The invention relates to the augmentation of rainfall and to means for obtaining such effect. The invention is based on the dissemination in the atmosphere of finely divided water-insoluble long chain alcohols which elevate the ice-nucleating threshold temperature.

Antifreeze molecules—whether in the bloodstreams of fish in polar waters or in the gasoline tanks of automobiles—prevent ice from forming by interfering with crystal formation; a liquid containing an antifreeze can freeze only when it has been chilled to a temperature lower than its normal freezing point. Nucleators have the opposite effect: They promote the formation of ice. The induction or inhibition of crystal formation is important in both biological systems (how frost bacteria destroy crops) and in the nonbiologic (how rain clouds might be seeded).

Pure water can be supercooled to temperatures of $-20°$ C. to $-40°$ C. Promotion of ice nucleation, necessary for rainfall, has been exploited in the induced precipitation of rain by silver iodide seeded in clouds. Silver iodide is used today as an artificial rain nucleating system. It increases ice nucleation temperature by about $5°$ C., resulting in an increase of about 20% of the precipitation in a given region.

There is a continuous search for better materials that can be used as cloud seeding agents. Some crystalline organic substances (Parungo et al., J. Atmos. Sci. 24: 274 (1967) and certain bacteria (Levin et al., J. Climate and Appl. Meteorology, 26: 1188 (1987) were found to nucleate ice efficiently as silver iodide.

It was now found that the spreading of monolayers of water insoluble alcohols on small water drops, raises the freezing point of these in a significant manner and reduces the supercooling to a larger extent than the hitherto used means for nucleating ice formation.

The present invention relates to the use of aliphatic long-chain alcohols of the formula

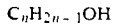

$C_nH_{2n+1}OH$ or

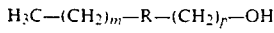

$H_3C-(CH_2)_m-R-(CH_2)_p-OH$ where $n>14$ and $m+p>14$ and R is an unsaturated radical, an heteroatom, carbonyl or carbonyloxy, to induce nucleation of ice at temperatures within the range from $-8°$ C. to $0°$ C., from supercooled water present as small drops and/or in the vapour state. In particular, the invention relates to the use of said alcohols for cloud seeding for augmenting rainfall.

In a preferred embodiment, alcohols of the formula $C_nH_{2n+1}OH$ are used when n is an odd number. Preferably, n is 27, 29 or 31 when nucleation of ice is induced at temperatures from about $-2.7°$ C. to about $0°$ C. The most preferred alcohol is $C_{31}H_{63}OH$.

The invention further relates to a method for augmenting rainfall which comprises seeding supercooled clouds with an alcohol as defined above.

The alcohols of the invention can have both antifreeze and nucleating effects depending on whether they mix into the solution or form surface monolayers. At the monolayer-solution interface, hexagonal ice crystals and hexagonal OH groups from the alcohol apparently fit nicely together; this promotes ice formation and oriented crystal growth. The raised freezing point was sensitive to the length of the alcohol chain, the number (even or odd) of carbon atoms in the chain and the percentage of the surface of the liquid droplet that was covered by the nucleating alcohol. The temperature elevation of ice nucleation obtained by the monolayer systems of the invention is about $10°$ C. in comparison to only $5°$ C. for silver iodide. The amphiphilic alcohols are also biodegradable, are cheaper and have to be used in minute quantities.

In the experiments of the invention, the freezing point measurements were carried out on two water drops of the same size (ranging from 10 to 40 $\mu$l) placed on a cooling stage in a box purged by cooled nitrogen gas. One drop was completely covered with a monolayer of the amphiphilic chain alcohol and the other with a reference material, such as the corresponding long chain fatty acid. In this way the effect of all factors responsible for induction of nucleation, other than a difference in structural match, are eliminated.

The samples were cooled at a rate of $\sim 1°$ C./min. The temperature of the drops was measured by a thermocouple. The melting point of ice was used for its calibration. The freezing points were observed by a light microscope. Temperatures of freezing were determined in comparative experiments carried out simultaneously for two different materials. The various amphiphiles can be divided into three categories: (a) the reference materials have the lowest ice nucleation temperature; (b) the aliphatic alcohols show an increasing order of nucleation efficiency with the increase in chain length, and (c) the alcohols with larger areas per molecule are poor nucleators.

EXAMPLES

The water drops (10 $\mu$l) were placed on a cooled stage under an optical microscope. One of the drops was covered by 0.5 $\mu$l of the alcohol in chloroform. The second drop was covered in a similar way by a reference amphiphilic material. The solvent was allowed to evaporate. The system was purged with nitrogen and cooled down at a rate of about $1°$ C./min. The freezing point observed for both drops was determined. The freezing point of the drop covered with the reference material was at a lower temperature.

The results are shown in Table I.

The results of the freezing point measurements showed that aliphatic chain alcohols nucleate ice at higher temperatures, and with greater reproducibility, than the analogous carboxylic acids. The freezing point of drops of pure water, by way of comparison, ranged from $-20°$ C. to $-25°$ C.

It is striking that the freezing point is so sensitive to the length and parity of the chain of the alcohol $C_nH_{2n+1}OH$. The freezing point curve for the n-odd series increases asymptotically with chain length, approaching $0°$ C. for $n=31$. The n-even series behaves differently; the freezing point curve reaches a plateau of about $-8°$ C. for in the range of 22 to 30. This trend suggests that just prior to ice nucleation, the orientation of the OH groups in the odd and even analogues are not the same, the former having a structural fit closer to the structure of the lattice of ice.

According to the invention, a suitable preparation of the long-chain aliphatic alcohols, e.g., an emulsion, is brought in contact with supercooled clouds in order to induce nucleation and increase rainfall. The dynamic method of cloud seeding whereby the material is seeded on the upper supercooled part of the cloud in increased concentrations is suitable for this purpose. The material may be dispersed in the clouds in a finely dispersed form. It may be applied as a fog released